United States Patent [19]

Settino

[11] 3,765,858
[45] Oct. 16, 1973

[54] METHOD OF ROLL FORMING A RIBBON OF GLASS AT HIGH TEMPERATURE
[75] Inventor: Frederick A. Settino, New Kensington, Pa.
[73] Assignee: PPG Industries, Inc., Pittsburgh, Pa.
[22] Filed: Mar. 10, 1972
[21] Appl. No.: 233,747

[52] U.S. Cl............................ 65/101, 65/374, 29/132
[51] Int. Cl............................................. C03b 13/16
[58] Field of Search................. 65/92, 100, 101, 65/374, 29; 29/132

[56] References Cited
UNITED STATES PATENTS

| | | | |
|---|---|---|---|
| 1,937,382 | 11/1933 | Cone | 65/356 X |
| 2,115,465 | 4/1938 | Merten | 29/132 |
| 3,553,004 | 1/1971 | Schnedler | 29/132 X |

*Primary Examiner*—Arthur D. Kellogg
*Attorney*—Russell A. Eberly

[57] ABSTRACT

High-melting glass or glass-ceramic material is formed by being brought into contact with a member that has at least a surface portion thereof that consists essentially of an iron-base alloy having substantially the following composition: 0.12 to 0.18 percent carbon, 1.0 to 3.0 percent manganese, 0.25 to 1.25 percent silicon, 1.0 to 2.0 percent molybdenum, 5.0 to 5.8 percent chromium, 1.0 to 2.0 percent tungsten, balance substantially iron except for incidental impurities in minor amounts that do not affect the properties. In particular, it is advantageous to roll-form the glass or glass-ceramic material between rolls provided with a weld-overlay coating of the iron-base alloy mentioned above. Though such alloy is lower in strength and hardness than other alloys or steels such as AISI Type 410 or 420 stainless steel hitherto used for such purpose, it has been found in roll-forming experiments that such material has a service life of 18 to 34 days, rather than about 10 days or less for the prior-art alloys of greater strength and hardness hitherto used for the purposes indicated above.

4 Claims, No Drawings

METHOD OF ROLL FORMING A RIBBON OF GLASS AT HIGH TEMPERATURE

BACKGROUND OF THE INVENTION

1. Field of the Invention: This invention relates to the making of flat glass by a process that involves the forming of a glass or glass-ceramic composition of high-melting nature by bringing such glass into contact with a member having at least a surface thereof composed of a particular iron-base alloy. In particular, the invention relates to the manufacture in substantial quantity of roll-formed flat pieces of a high-melting (over 2,300°) glass-ceramic composition substantially as follows: 19.0 percent alumina, 1.7 percent titanium dioxide, 1.4 percent zirconium dioxide, 0.5 percent antimony trioxide, 3.8 percent lithium dioxide, 0.60 percent oxides of sodium and potassium, 0.1 percent chlorine, 1.4 percent phosphorus pentoxide, 1.9 percent zinc oxide, balance silica.

2. Description of the Prior Art: The present invention concerns the melting and forming of glasses that melt and are formable at relatively high temperatures, such as 2,500° and greater. In particular, it concerns the melting and forming of a glass-ceramic composition such as one of those taught in Stookey et al. U. S. Pat. No. 2,920,971 or Petticrew U. S. Pat. No. 3,625,718.

The glass-ceramic compositions of the patents mentioned above are so high-melting that it is unusual for them to be formed by any of the processes most commonly used for the forming of ordinary soda-lime glass.

In other words, they are not usually drawn vertically as in the Pittsburgh or Fourcault or Colburn processes, and they are not usually made by float forming on a bath of molten tin, as indicated in U. S. Pat. No. 3,083,551. Ordinary soda-lime glasses are sometimes formed by being passed between metal rolls to obtain a rough-rolled ribbon that may subsequently be ground and polished to yield plate glass, but those skilled in the art of forming glass have looked away from handling the high-melting glass-ceramic compositions of the above-mentioned patents in the same way.

Admittedly, making a product by roll-forming continuously appears at first to be more attractive than forming the glass piece by piece by pressing measured quantities of glass into individual molds. A continuously produced ribbon can be cut into a variety of desired sizes, etc.; thus, there are not the expenses connected with preparing and handling and maintaining the individual molds of the desired size or sizes; there is no pressing equipment to provide and maintain.

On the other hand, continuously roll-forming a high-melting glass presents serious problems. At the higher forming temperatures, the rolls themselves are more likely to sag or warp or creep or become oxidized; there is a considerably greater likelihood of getting some sort of checking or mud-cracking in the surface of the product glass as a result of the temperature difference between the forming rolls and the glass; a roll-forming operation necessarily involves not only edge-trim losses that come inescapably from the nature of a continuous operation (for example, a temporary complete shutdown to clean up breakage in the annealing lehr or to change a set of rolls that are marking the glass intolerably or are otherwise unsatisfactory).

Early efforts at roll-forming of glass-ceramic compositions in accordance with the above-mentioned patents seemed to indicate that roll-forming is impractical. In such efforts, there were used rolls that were made of or provided with a surface of AISI Type 410 or AISI Type 420 stainless steel, and in each case, after about 7 to 10 days of service, the rolls tended to develop surface cracking that made it necessary to interrupt the operation and withdraw the rolls for reconditioning. Such being the case, it appeared unlikely that a person of ordinary skill in the art could readily devise a practice for roll-forming into sheet form a quantity of high-melting glass or glass-ceramic composition wherein it would not be necessary at reasonably frequent intervals to recondition the surface of the roll.

So far as I know, the prior art contains no suggestion that the problem indicated above can be solved with the use of an iron-base material that is substantially lower in strength and hardness than the roll-face materials hitherto commonly used for the forming of glass in accordance with the prior art.

SUMMARY OF THE INVENTION

It has been discovered that it is advantageous to form quantities of high-melting glass compositions or glass-ceramic compositions such as those of U. S. Pat. No. 2,920,971 by bringing such quantities of glass while molten into contact with a roll made of or faced with an alloy consisting essentially of 0.12 to 0.18 percent carbon, 1.0 to 3.0 percent manganese, 0.25 to 1.25 percent silicon, 1.0 to 2.0 percent molybdenum, 5.0 to 5.8 percent chromium, 1.0 to 2.0 percent tungsten, and the balance substantially iron. Such rolls make it possible to produce a great quantity of flat glass of the kind mentioned above at relatively low cost in a continuous operation.

DESCRIPTION OF THE PREFERRED EMBODIMENT

This invention concerns the forming glass or glass-ceramic composition, such as a glass-ceramic composition as follows: 19.0 percent alumina, 1.7 percent titanium dioxide, 1.4 percent zirconium dioxide, 0.5 percent antimony trioxide, 3.8 percent lithium dioxide, 0.60 percent total alkalies ($Na_2O$, $K_2O$), 0.1 percent chlorine, 1.4 percent phosphorus pentoxide, 1.9 percent zinc oxide, balance silica. A glass of such a composition melts at a temperature substantially above 2,300°. In accordance with prior practices, the forming of such glass-ceramic composition into sheets or plates has been done either by casting or casting-and pressing molten material of such composition into a mold, which is disadvantageous because of the discontinuous nature of the operation and the consequent high cost thereof, or by forming such a glass or glass-ceramic composition between metal rolls that are made of or faced with a high-temperature alloy such as AISI Type 410 or AISI Type 420 stainless steel. The latter practice is disadvantageous in that after about 7 to 10 days of service, the surfaces of the rolls tend to develop cracking or "alligatoring" that makes it necessary to interrupt the rolling operation and recondition the rolls. This happens despite the periodic cleaning or conditioning that is regularly done, i.e., a sandblasting of the surfaces of the rolls while they are operating, performed about once every 16 hours. Such sandblasting does not remove surface cracks, if they have formed.

In accordance with the instant invention, there are used, in the roll-forming of a glass or glass-ceramic composition of the kind indicated above, rolls that are made of or faced with an alloy consisting essentially of 0.12 to 0.18 percent carbon, 1.0 to 3.0 percent manganese, 0.25 to 1.25 percent silicon, 1.0 to 2.0 percent molybdenum, 5.0 to 5.8 percent chromium, 1.0 to 2.0 percent tungsten, and the balance substantially iron except for impurities in minor amounts that do not deleteriously affect the properties. A suitable material having the composition indicated above is sold by the McKay Company of Pittsburgh, Pennsylvania, under the designation No. 821. Suitable material has a nominal composition as follows: 0.15 percent carbon, 2.0 percent manganese, 0.75 percent silicon, 1.5 percent molybdenum, 5.4 percent chromium, 1.5 percent tungsten, balance substantially iron. Though it is possible, of course, to use a roll made of such alloy, it is convenient and economical in most instances merely to provide an existing roll body with a weld facing of such material. Those skilled in the art will understand how to use automatic submerged-arc welding equipment, continuously rotating the roll body while a welding head traverses the length of the roll to be faced with the No. 821 alloy or the like, so that there is deposited on the roll body a spiral weld bead along the roll surface. Such a facing of the roll may conveniently be made using a deposition rate of 10 to 20 pounds per hour, with a welding current of 300 to 450 amperes. The alloy is produced by reaction or alloying between powders that are contained in a mild-steel hollow-wire electrode. During the welding operation, shielding is provided by a powdered neutral flux material which completely covers the arc and also melts to form a protective slag layer over the molten weld material.

It is important that the weld-overlay operation be done carefully. For example, it is intolerable for the welding to be done under conditions such that the roll is covered with a discernible weld-bead spiral in which the adjacent laps are not adequately fused to one another but are instead separate and distinct. If a roll so improperly weldcoated is further prepared for use (by grinding the roll face smooth), there is obtained a roll that is unsatisfactory; it fails immediately or after a very short service life, perhaps one or two days. What is desired is a roll that is covered with a coating of weld material that has a smooth surface and is free of defects, imperfections or discontinuities of any sort, the thickness of the coating on the as-ground roll being on the order of 5 to 15 millimeters if the roll is 200 to 230 millimeters in diameter. Those skilled in the art of weld-overlay coating will be able from the foregoing and with a minimal effort directed to the selection and establishment of appropriate coating conditions to produce a roll of adequate properties and characteristics.

In tests involving the use of a pair of forming rolls made as indicated above for the rolling of a ribbon of glass having the composition indicated above, it has been found that it is possible to obtain a service life on the order of 18 to 34 days. This is somewhat surprising, since previously about the best that could be done in such a roll-forming operation was to use roll bodies that were made of or had been hard-faced with AISI Type 410 or AISI Type 420 stainless steel, thereby obtaining a service life on the order of 7 to 10 days. The superior performance of the No. 821 alloy is surprising in that such alloy is substantially lower in strength and hardness than AISI Type 420 stainless steel (160,000 psi tensile strength, Rockwell C-40 hardness for No. 821 alloy in the hardened and tempered condition, versus 230,000 psi tensile strength, Rockwell C-50 hardness for AISI Type 420 stainless steel).

So that the nature of the rolling operation will be better understood, it should be said that the rolls used may be about 9 inches in outside diameter and perhaps 24 to 42 inches wide, and they may rotate during the forming operation at about 2 revolutions per minute. In the roll-forming operation, it is considered desirable to produce a ribbon of glass-ceramic composition that is sufficiently good in its surface characteristics that it may be used without any subsequent grinding and polishing. To grind and polish is costly; moreover, it tends to open up surface imperfections that render the product piece less resistant to staining when in service, e.g., as a range-top element.

In the above alloy, the carbon content is rather critical; too little carbon gives inadequate strength for the service-life requirements, and too much carbon also deleteriously affects the service life by making the alloy too brittle. Manganese is present in an appropriate amount, considering the desired microstructure (substantially completely martensitic) and working properties. Molybdenum and tungsten and chromium are present as solution strengtheners. As those skilled in the art are aware, molybdenum and tungsten are to some extent equivalents: similar results can be obtained so long as the total content of molybdenum plus half the tungsten is 1.5 to 3.0 per cent, preferably 2.0 to 2.5 per cent by weight. The usual impurities, phosphorus and sulfur, are held to the usual low levels, 0.5 per cent maximum for each.

When weld-coated rolls are used, the roll body may be made of any suitable material, such as carbon steel, low-alloy high-strength steel, or stainless steel. Good results have been obtained with AISI Type 416 stainless steel, but those skilled in the art will appreciate that other materials could be used. In any event, the rolls are internally fluid-cooled, preferably with water, so as to maintain a surface temperature on the order of 1,000 to 1,500°. The conditions indicated herein are suitable for the production of a ribbon on the order of 18 to 24 inches wide and about 0.190 to 0.230 inch thick at a rate of 40 to 60 inches per minute. Those skilled in the art will perceive how the parameters specified above may be adjusted, within limits, to suit the requirements of the manufacturing operation.

I claim as my invention:

1. A method for producing a continuous ribbon of a high-melting glass-ceramic composition that melts at above 2,300° comprising:

a. passing such composition while molten between a pair of internally fluid-cooled forming rolls having a surface portion made of a substantially completely martensitic iron-base material containing about 5 to 5.8 weight percent of at least one strengthening element selected from the group consisting of chromium, molybdenum, and tungsten wherein said composition consists essentially of about: 19 percent alumina, 1.7 percent titanium dioxide, 1.4 percent zirconium dioxide, 0.5 percent antimony trioxide, 3.8 percent lithium dioxide, 0.60 percent of alkali-metal oxides, 0.1 percent of chlorine, 1.4 percent of phosphorus pentoxide, 1.9 percent zinc oxide, and the balance silica, b. cooling said molten glass to form a ribbon of glass, and c. removing said ribbon of glass from said rolls.

2. A method for producing a continuous ribbon of glass having a composition that melts at above about 2,300° comprising:

a. passing said composition while molten between a pair of internally fluid-cooled rolls having a surface portion made of a substantially completely martensitic iron-base material comprising 0.12 to 0.18 percent carbon, 1.0 to 3.0 percent manganese, 0.25 to 1.25 percent silicon, 5.0 to 5.8 percent of at least one material selected from the group consisting of chromium, tungsten, and molybdenum in an amount such that the molybdenum content plus half the tungsten content is within the range of from about 1.5 to 3.0 percent and the balance substantially iron except for incidental impurities in minor amounts insufficient to affect the properties thereof, b. cooling said molten glass to form a ribbon of glass, and c. removing said ribbon of glass from said rolls.

3. A practice as defined in claim 2, further characterized in that said material contains 1 to 2 percent each of molybdenum and tungsten.

4. A method as defined in claim 2 wherein said composition being formed is a ceramable glass composition comprising alumina, titanium dioxide, zirconium dioxide, antimony trioxide, lithium dioxide, alkali metal oxide, phosphorus pentoxide, zinc chloride and silica.

* * * * *